United States Patent
Merry et al.

(10) Patent No.: US 9,358,749 B2
(45) Date of Patent: Jun. 7, 2016

(54) TUBULAR, CONTINUOUS, SEAMLESS, COMPRESSIBLE, RESILIENT MOUNTING ARTICLES AND POLLUTION CONTROL DEVICES COMPRISING THE SAME

(75) Inventors: Richard P. Merry, St. Paul, MN (US); Javier E. Gonzalez, East Amherst, NY (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 458 days.

(21) Appl. No.: 13/382,254

(22) PCT Filed: Jul. 9, 2010

(86) PCT No.: PCT/US2010/041450
§ 371 (c)(1),
(2), (4) Date: Jan. 4, 2012

(87) PCT Pub. No.: WO2011/006023
PCT Pub. Date: Jan. 13, 2011

(65) Prior Publication Data
US 2012/0107186 A1      May 3, 2012

Related U.S. Application Data

(60) Provisional application No. 61/224,260, filed on Jul. 9, 2009.

(51) Int. Cl.
*B01D 50/00*      (2006.01)
*B32B 1/08*       (2006.01)
(Continued)

(52) U.S. Cl.
CPC ... *B32B 1/08* (2013.01); *B32B 3/04* (2013.01); *B32B 5/022* (2013.01); *B32B 9/005* (2013.01); *B32B 9/007* (2013.01); *B32B 9/045* (2013.01); *B32B 27/12* (2013.01); *B32B 2260/021* (2013.01); *B32B 2260/046* (2013.01); *B32B 2262/10* (2013.01); *B32B 2307/30* (2013.01); *B32B 2307/718* (2013.01);
(Continued)

(58) Field of Classification Search
CPC ............ F01N 3/28; D04H 13/00; D03D 9/00; B29C 43/02; B01D 53/86
USPC .................................. 422/179, 180; 428/116
See application file for complete search history.

(56) References Cited

U.S. PATENT DOCUMENTS 3,001,571 A    9/1961   Hatch
4,521,333 A    6/1985   Graham
(Continued)

FOREIGN PATENT DOCUMENTS

EP         192417 A2 *   8/1986
EP         299626 A2 *   1/1989
(Continued)

OTHER PUBLICATIONS

PCT International Search Report for PCT/US2010/041450, mailed Nov. 19, 2010.

*Primary Examiner* — Tom P Duong

(57) ABSTRACT

Tubular, continuous, seamless, compressible, resilient mounting article comprising inorganic fibers, and having an inner curved surface, a central longitudinal axis, and a uniform internal cross-sectional area along the central longitudinal axis. The mounting articles are useful, for example, in mounting pollution control elements in pollution control devices.

20 Claims, 1 Drawing Sheet

(51) Int. Cl.
*B32B 5/02* (2006.01)
*B32B 9/00* (2006.01)
*B32B 9/04* (2006.01)
*B32B 27/12* (2006.01)
*B32B 3/04* (2006.01)
*F01N 3/28* (2006.01)

(52) U.S. Cl.
CPC ...... *B32B 2307/72* (2013.01); *B32B 2307/736* (2013.01); *B32B 2597/00* (2013.01); *B32B 2605/00* (2013.01); *F01N 3/2853* (2013.01); *F01N 3/2857* (2013.01); *Y10T 29/49826* (2015.01); *Y10T 428/13* (2015.01)

(56) References Cited

U.S. PATENT DOCUMENTS

| | | | |
|---|---|---|---|
| 5,686,039 | A | 11/1997 | Merry |
| 6,726,884 | B1 | 4/2004 | Dillon |
| 6,923,942 | B1 | 8/2005 | Shirk |
| 2001/0046456 | A1* | 11/2001 | Langer et al. ................. 422/179 |
| 2003/0097752 | A1* | 5/2003 | Shirk et al. ...................... 29/890 |
| 2006/0070554 | A1 | 4/2006 | Braunreiter |
| 2009/0041967 | A1* | 2/2009 | Tomosue et al. ............. 428/36.8 |
| 2011/0240165 | A1* | 10/2011 | De Rovere et al. ........... 138/148 |

FOREIGN PATENT DOCUMENTS

| | | |
|---|---|---|
| EP | 1182333 | 2/2002 |
| EP | 1495807 | 1/2005 |
| JP | 2002047070 | 2/2002 |
| WO | 98/50688 | 11/1998 |
| WO | 00/75496 | 12/2000 |
| WO | WO 0075496 A1 * | 12/2000 |
| WO | 2004/011785 | 2/2004 |
| WO | 2005/000466 | 1/2005 |
| WO | WO 2006/065534 | 6/2006 |
| WO | WO 2008/156942 | 12/2008 |

* cited by examiner

TUBULAR, CONTINUOUS, SEAMLESS, COMPRESSIBLE, RESILIENT MOUNTING ARTICLES AND POLLUTION CONTROL DEVICES COMPRISING THE SAME

CROSS REFERENCE TO RELATED APPLICATIONS

This application is a national stage filing under 35 U.S.C. 371 of PCT/US2010/041450, filed Jul. 9, 2010, which claims priority to U.S. Provisional Application No. 61/224,260, filed Jul. 9, 2009, the disclosures of which are incorporated by reference in their entireties herein.

BACKGROUND

Pollution control devices such as catalytic converters for gasoline engines have been known for over 30 years. In the last few years, more stringent regulations for diesel vehicles have resulted in a rapid increase in the use of other pollution control devices including diesel oxidation catalysts (DOCs), diesel particulate filters (DPFs), and selective catalytic reduction devices (SCRs). Such pollution control devices typically comprise a metal housing or casing with a pollution control element securely mounted within the casing by a resilient and flexible mounting mat. Catalytic converters, including diesel oxidation converters, contain a catalyst, which is typically coated on a monolithic structure. The monolithic structures are typically ceramic, although metal monoliths are also known. The catalyst in a gasoline engine oxidizes carbon monoxide and hydrocarbons and reduces the oxides of nitrogen to control atmospheric pollution. A diesel oxidation catalyst oxidizes the soluble organic fraction of soot particles as well as any carbon monoxide present.

Diesel particulate filters or traps are typically wall-flow filters, which have honeycombed, monolithic structures that are typically made from porous crystalline ceramic materials. Alternate cells of the honeycombed structure are typically plugged such that exhaust gas enters in one cell and is forced through the porous wall to an adjacent cell where it can exit the structure. In this way, the small soot particles that are present in diesel exhaust are collected. From time to time, the temperature of the exhaust gas is increased above the incineration temperature of the soot particles so that they are burned. This process is called "regeneration."

Selective catalytic reducers are similar in structure and in function (i.e., reduce $NO_x$) to catalytic converters. A gaseous or liquid reductant (generally ammonia or urea) is added to the exhaust gas before reaching the selective catalytic reducer monolith. The mixed gases cause a reaction between the $NO_x$ emissions and the ammonia or urea. The reaction converters the $NO_x$ emissions into pure nitrogen and oxygen.

The monoliths, and in particular the ceramic pollution control monoliths, used in pollution control devices are fragile, and susceptible to vibration or shock damage and breakage. They have a coefficient of thermal expansion generally an order of magnitude less than the metal housing that contains them. This means that as the pollution control device is heated the gap between the inside periphery wall of the housing and the outer wall of the monolith increases. Even though the metallic housing undergoes a smaller temperature change due to the insulating effect of the mat, the higher coefficient of thermal expansion of the metallic housing causes the housing to expand to a larger peripheral size faster than the expansion of the ceramic monolith. Such thermal cycling can occur many times each day during the life and use of the pollution control device.

To avoid damage to the ceramic monoliths from road shock and vibration, to compensate for the thermal expansion difference, and to prevent exhaust gases from passing between the monolith and metal housing (thereby bypassing the catalyst), mounting mats are disposed between the ceramic monolith and metal housing. These mats exert sufficient pressure to hold the monolith in place over the desired temperature range but not so much pressure as to damage the ceramic monolith. Known pollution control mounting mats include intumescent and non-intumescent sheet materials comprised of inorganic (e.g., ceramic) fibers, and organic and/or inorganic binders. The mat is wrapped around the monolith and generally has a tongue and groove configuration in order to seal against gas bypass despite the large outside circumference tolerance of the monolith. The process of placing or inserting the ceramic monolith and mounting material within the metal housing is refereed to as canning and includes such processes as wrapping an intumescent sheet or ceramic mat around the monolith and inserting the wrapped monolith into the housing.

In relatively low temperature applications (e.g., diesel particulate filters), typical organic component content (9% by weight or more) can lead to reduced mat mount performance due to changes in the binder that occur during use are typically detrimental to physical properties of the mat (e.g., due to stiffening or reduction in resiliency). Reductions in the total organic component content typically results in increased performance for the mounting mat, but can be detrimental to the internal strength of the mat, leading to mat shearing during the canning process.

SUMMARY

The present disclosure describes a tubular, continuous, seamless, compressible, resilient mounting article having first and second opposed ends, an outer surface, an inner surface, at least a portion of which is curved (in some embodies the inner surface is at least 50, 60, 70 75, 80, 85, 90, 95, or even 100 percent curved), a central longitudinal axis, and a uniform internal cross-sectional area along the central longitudinal axis, wherein the mounting article comprises inorganic fibers.

As used herein, the reference to the mounting article being tubular and continuous indicates that the mounting article has a continuous tubular shape (e.g., a cylindrical tube or elliptical tube shape), which can function as a sleeve into which a pollution control element structure (e.g., a monolithic structure) can be disposed. It can be desirable for the mounting article to be free of any slits or other openings in its outer major surface. As used herein, the reference to the mounting article being compressible indicates that the wall thickness of the mounting article can be compressed up to and including 60% of its free thickness without applying compressive force exceeding 1000 kPa. As used herein, the reference to the mounting article being resilient indicates that the mounting article can deform its cross section in any direction (e.g., its longitudinal, transverse, and/or thickness direction) by at least 2% without breaking. As used herein, the reference to the internal cross-sectional area, along the central longitudinal axis of the mounting article, being uniform indicates that the radii from the central longitudinal axis to the inner surface along any radial flat plane along the central longitudinal length is within 2% (in some embodiments within 1.5%, or even within 1%) of the average radii along that plane.

In some embodiments, tubular, continuous, seamless, compressible, resilient mounting articles described herein having a Resiliency Value after three thermal cycles from 25° C. to 900° C./530° C. of the Real Condition Fixture Test (described in Example 1, below) of at least 20 kPa (in some embodiments, at least 25 kPa, 30 kpa, 35 kPa, 40 kPa, 45 kPa, 50 kPa, 75 kPa, 100 kPa, or more; in some embodiments, in a range from, for example, 20 kPa to 1400 kPa or 50 kPa to 1400 kPa).

Tubular, continuous, seamless, compressible, resilient mounting articles described herein are useful, for example, in pollution control devices. An exemplary pollution control device comprises a pollution control element (e.g., catalytic converter, a diesel particulate filter, or a selective catalytic reduction element) mounted in a casing using a mounting article described herein.

An advantage of embodiments of mounting articles described herein over conventional sheet-form mounting mats can include: eliminating the need to wrap the sheet-form mounting mat around, and optionally adhere the mat to, a monolithic pollution control element. Another advantage can also be: avoiding the use of a tongue and groove seam typically found in sheet-form mounting mats. Such a seam can result in an uneven pressure being exerted on the monolith by the mounting mat. Such areas of uneven pressure can act as a starting point for mat erosion by pulsating exhaust gases. An additional advantage of embodiments of mounting articles described herein can include reducing or eliminating the amount of mounting material scrapped or wasted during the manufacture of convention sheet-form mounting mats, which are typically die-cut into their final form. That is, the mounting articles describe herein are more net shaped (i.e., no die cutting or other trimming of mounting material is needed to achieve the final form of the mounting article).

Further, advantages of embodiments of mounting article described herein can include, but are not limited to: the mounting article can be secured to a pollution control element by making the inner periphery (e.g., inside circumference) of the mounting article slightly smaller than the corresponding outer periphery (e.g., outside circumference) of the pollution control element and stretching the inner periphery so that it can be disposed around the corresponding outer periphery of the pollution control element. Once the mounting article is so disposed around the pollution control element, the mounting article is held in tension around the monolith. In other exemplary embodiments, the mounting article can be made with an internal circumference slightly larger than a corresponding outer circumference of the pollution control element, which allows the mounting article to be loosely slipped over the pollution control element. The mounting article is then compressed in place around the pollution control element with a heat shrinkable tube or film. Fixing the mounting article in place by tension or compression allows easy assembly of the pollution control device without the mat slipping during assembly.

DETAILED DESCRIPTION

Figure 1:
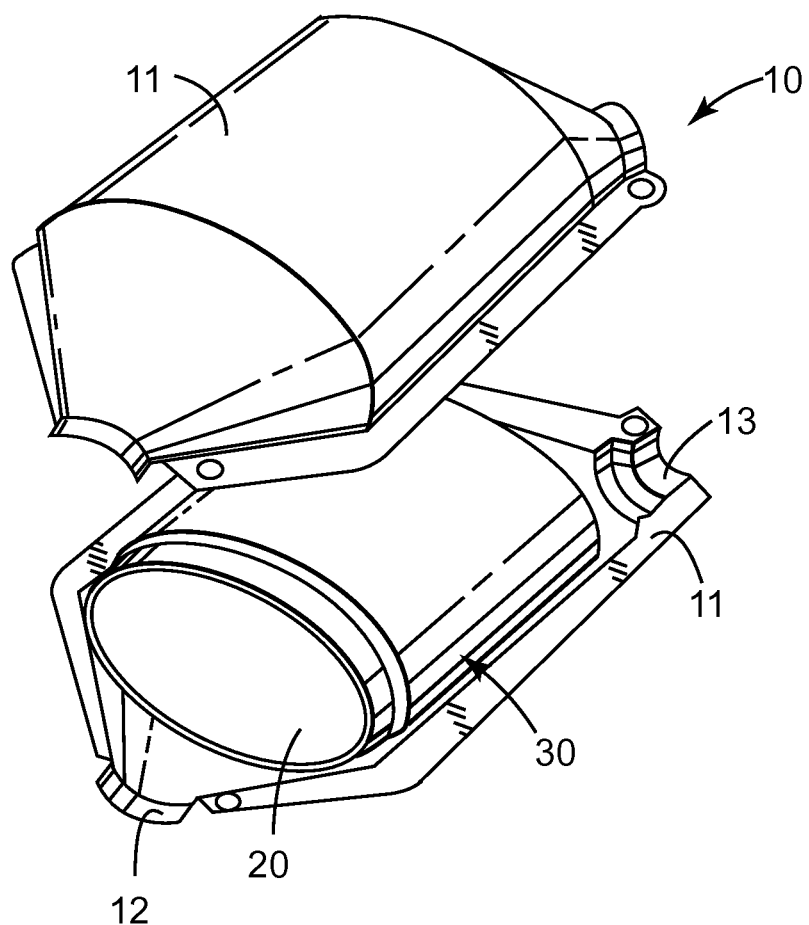
FIG. 1 is a perspective view of an exemplary pollution control device described herein with an exemplary tubular, continuous, seamless, compressible, resilient mounting article described herein.

Referring to FIG. 1, pollution control device 10 comprises metallic casing 11 with generally frusto-conical inlet and outlet ends 12 and 13, respectively. Disposed within casing 11 is monolithic pollution control element 20 surrounded by tubular, continuous, seamless, compressible, resilient mounting article or mat 30 described herein. The mounting article 30 serves to tightly but resiliently support and hold monolithic element 20 within casing 11 and seals the gap between the pollution control element 20 and the casing 11, thereby reducing, minimizing, or preferably preventing exhaust gases from by-passing pollution control element 20.

For an article comprising a tubular, continuous, seamless, compressible, resilient mounting article described herein and a pollution control element (e.g., catalytic converter, a diesel particulate filter, or a selective catalytic reduction element), typically the outer surface of the pollution control element is frictionally contacting the inner surface of the mounting article.

"Fibers," as used herein, have a length of at least 5 micrometers, and an aspect ratio of at least 3:1 (i.e., length to diameter).

Exemplary inorganic fibers include a variety of oxides such as silicates, aluminates, alumino-silica compounds, zircon, biosoluble compositions (e.g., calcium magnesium silicate and magnesium silicate), glass compositions (e.g., S-glass and E-glass), amorphous, crystalline, and partially crystalline compositions, and mineral fibers (basalts), mineral wools, and combinations, as well as carbides (e.g., silicon carbide and silicon carbide), nitrides (e.g., silicon nitride and boron nitride), and combinations thereof.

In some embodiments, the inorganic fiber comprise glass (i.e., amorphous material (i.e., material derived from a melt and/or a vapor phase that lacks any long range crystal structure) having a softening point, and comprising collectively not more than 95% percent by weight $SiO_2$ (if present) and $Al_2O_3$ (if present), based on the total weight of the inorganic fibers, where in the glass has a softening point as determined by ASTM C338-93 (2008), the disclosure of which is incorporated herein by reference), of at least than 400° C. Exemplary glass fibers include (e.g., magnesium aluminum silicate glass fibers).

Exemplary magnesium aluminum silicate glass fibers include E-glass fibers, S-glass fibers, S-2 glass fibers, R-glass fibers, and mixture thereof. E-glass, S-glass and S-2 glass are commercially available, for example, from Advanced Glassfiber Yarns, LLC, Aiken, S.C. R-glass is commercially available, for example, from Saint Gobain Vetrotex, Chambery, France.

In some embodiments, the inorganic fibers comprise refractory ceramic fibers (e.g., aluminosilicate fibers (including annealed and amorphous aluminosilicate fibers), alumina fibers, silica fibers, and basalt fibers). "Refractory," in the context of refractory ceramic fibers, refers to amorphous man-made inorganic materials produced from a melting, blowing or spinning of calcined kaolin clay or a combination of alumina and silica. Other oxides such as ziconia, titania, magnesia, iron oxide, calcium oxide, and alkalies may also be present. $SiO_2$ content of the refractory material is greater than 20% by percent by weight, and $Al_2O_3$ is greater than 20%, by weight, wherein $SiO_2$ and $Al_2O_3$ collectively comprise at least 95% of the inorganic material. Optionally, refractory ceramic fibers can be partially or completely crystallized by heat treatment. Exemplary amorphous, refractory aluminosilicate ceramic fibers include blown or spun amorphous refractory ceramic fibers (commercially available, for example, from Thermal Ceramics, Augusta, Ga., under the trade designation "KAOWOOL" and "CERAFIBER," and from Unifrax Corporation, Niagara Falls, N.Y., under the trade designation "FIBERFRAX").

In some embodiments, the inorganic fibers include polycrystalline ceramic fibers (e.g., such as those available under the trade designations "SAFFIL" from Saffil Automotive, Chelsea, Mich., and "MAFTEC" from Mitsubishi Chemicals USA, Inc., Chesapeake, Va.).

In some embodiments, the inorganic fibers comprise include biosoluble fibers (e.g., at least one of magnesium silicate fibers or calcium magnesium silicate fibers).

As used herein, "biosoluble inorganic fibers" refer to inorganic fibers that are decomposable in a physiological medium or a simulated physiological medium. Physiological medium refers to, but is not limited to, those bodily fluids typically found in the respiratory tract such as the lungs of animals or humans. Exemplary biosoluble inorganic fibers include those comprised of oxides of silicon, magnesium, and calcium (including calcium magnesium silicate fibers). These types of fibers are typically referred to as calcium magnesium silicate fibers and magnesium silicate fibers.

Biosoluble fibers are commercially available, for example, from Unifrax Corporation, Niagara Falls, N.Y., under the trade designations "ISOFRAX" and "INSULFRAX," under the trade designations "SUPERMAG 1200" from Nutec Fiberatec, Monterrey, Mexico, and Thermal Ceramics, Augusta, Ga., under the trade designation "SUPERWOOL." "SUPERWOOL 607" biosoluble fibers, for example, contain 60 to 70 weight percent $SiO_2$, 25 to 35 weight percent CaO, 4 to 7 weight percent MgO, and a trace amount of $Al_2O_3$.

As used herein, the term "heat-treated silica fibers" refers to inorganic fibers comprising at least 95 percent by weight $SiO_2$, which have been exposed to a heat treatment temperature of at least 400° C. for a heat treatment period of at least 5 minutes.

Exemplary heat-treated high silica content fibers are commercially available, for example, from Hitco Carbon Composites, Inc., Gardena, Calif., under the trade designation "REFRASIL." For example, the "REFRASIL F100" fiber contains about 96 to about 99 percent by weight $SiO_2$.

Basalt fibers are made from the mineral basalt. Basalt is a hard, dense volcanic rock that can be found in most countries. The basalt is crushed, washed, melted, and fed into platinum-rhodium extrusion bushings to form continuous filaments. Because the fibers are derived from a mineral, the composition of the fibers can vary but generally has a composition, by weight, of about 45 to about 55 percent $SiO_2$, about 2 to about 6 percent alkalis, about 0.5 to about 2 percent $TiO_2$, about 5 to about 14 percent FeO, about 5 to about 12 percent MgO, at least about 14 percent by weight $Al_2O_3$, and often nearly about 10 percent CaO.

In some embodiments, tubular, continuous, seamless, compressible, resilient mounting articles described herein further contain an organic binder in amounts up to 10 (or more) weight percent based on the weight of the mounting article. The organic binder is typically burned off when the mounting article is used at elevated temperatures such as those typically encountered in a pollution control device.

Tubular, continuous, seamless, compressible, resilient mounting article described herein can be formed by initially preparing an aqueous slurry containing inorganic fibers, vacuum forming a molded tubular preform from the aqueous slurry on a permeable forming die, optionally compressing the preform, and drying the preform to produce the tubular, continuous, seamless, compressible, resilient, mounting article.

In some embodiments, the inorganic fibers are shot free, or contain a very low amount of shot (e.g., less than 1% by weight, based on total weight of the fibers), while in other embodiments; the shot content can be even greater than 50% by weight, based on the total weight of the fibers.

Optionally, the tubular, continuous, seamless, compressible, resilient mounting articles described herein, can be non-intumescent or intumescent (i.e., comprises intumescent material (e.g., comprise vermiculite)). In some embodiments, it is preferable that the mounting article is non-intumescent (i.e., free of intumescent material (e.g., free of vermiculite)). As used herein, "non-intumescent" refers to a material that exhibits less than 10 percent free expansion in thickness under the same conditions. Some non-intumescent materials expand less than 8 percent, less than 6 percent, less than 4 percent, less than 2 percent, or less than 1 percent, when heated.

In some embodiments, tubular, continuous, seamless, compressible, resilient mounting articles described herein have a non-intumescent or intumescent outer major surface of the mounting article and/or a non-intumescent or intumescent inner major surface of the mounting article. This can be done, for example, by vacuum forming a first non-intumescent or intumescent perform, followed by vacuum forming a second non-intumescent or intumescent perform layer onto the first perform layer prior to drying. Thus, the mounting article can have one layer forming its outer surface and another layer forming its inner surface. Each of these layers can be different or the same. For example, each layer can be either an intumescent layer or a non-intumescent layer, but not both intumescent or non-intumescent layers.

Exemplary intumescent materials include unexpanded vermiculite, hydrobiotite, water swellable synthetic tetrasilicic fluorine type mica as described in U.S. Pat. No. 3,001,571 (Hatch), alkali metal silicate granules as described in U.S. Pat. No. 4,521,333 (Graham et al.), expandable graphite, or combinations thereof. Alkaline metal silicate granules are commercially available, for example, from 3M Company, St. Paul, Minn., under the trade designation "EXPANTROL 4BW." Expandable graphite is commercially available, for example, under the trade designation "GRAFOIL GRADE 338-50" from UCAR Carbon Co., Inc., Cleveland, Ohio. Unexpanded vermiculite is commercially available, for example, from Cometals Inc., New York, N.Y. In some applications, the intumescent materials are selected from unexpanded vermiculite, expandable graphite, or a combination thereof. The vermiculite can be treated, for example, with salts such as ammonium dihydrogen phosphate, ammonium nitrate, ammonium chloride, potassium chloride, or other soluble salts known in the art.

Tubular, continuous, seamless, compressible, resilient mounting articles described herein that are intumescent layers may comprise, for example, at least 5, at least 10, at least 20, at least 40, or at least 60 weight percent intumescent material, based on the weight of the mounting article.

Optionally, edges of the mat can be dipped in a solution of boric acid and colloidal silica prior to drying or other methods of improving the erosion resistance of the edges (see, e.g., PCT Publication No. WO2008/156942, published Dec. 24, 2008, the disclosure of which is incorporated herein by reference).

Optionally, tubular, continuous, seamless, compressible, resilient mounting articles described herein can further include inorganic fibers, binders (organic and/or inorganic (and/or precursor thereof)), plasticizers, wetting agents, dispersants, defoaming agents, latex coagulants, fungicides, filler materials, inorganic binders, and organic fibers.

Typically, tubular, continuous, seamless, compressible, resilient mounting articles described herein have an average thickness in the range from 3 mm to 50 mm, although thicknesses outside of these ranges may also be useful.

Exemplary lengths of the tubular, continuous, seamless, compressible, resilient mounting articles described herein are in a range from 4 cm to 40 cm. For some embodiments of tubular, continuous, seamless, compressible, resilient mounting articles described herein, the uniform internal cross-sectional area along the central longitudinal axis is, for example, circular, elliptical, trapezoidal (with curved corners), square (with curved corners), or rectangular (with curved corners). Exemplary diameters for the internal circular cross-section are in a range from 2.5 cm to 40 cm.

Typically, tubular, continuous, seamless, compressible, resilient mounting articles described herein have a basis weight in a range from 400 g/m$^2$ to 8500 g/m$^2$, although basis weights outside of this range may also be useful.

Typically, tubular, continuous, seamless, compressible, resilient mounting articles described herein have an as-made bulk density in a range from 0.1 g/cm$^3$ to 0.8 g/cm$^3$, although as-made bulk density outside of this range may also be useful.

In some embodiments, tubular, continuous, seamless, compressible, resilient mounting article described herein as-made, prior to heating above 500° C., contain not greater than 10 (in some embodiments, not greater than 9, 8, 7, 6, 5, 4, 3, 2, 1, 0.75, 0.5, 0.25, 0.1, or even zero) percent by weight organic material, based on the total weight of the mounting article.

In some embodiments, tubular, continuous, seamless, compressible, resilient mounting articles described herein comprise a polymeric material covering (e.g., a heat shrinkable or heat shrunk film, in some embodiments in the form of a tube) that is disposed so as to provide a compressive force onto the outer surface of the mounting article, thereby securing the mounting article around the pollution control element. In some embodiments, the polymeric covering covers all of the mounting article, including its annular edges.

Therefore, in another aspect, the present disclosure provides a method of making the article, the method comprising providing a tubular, seamless, compressible, resilient mounting article described herein; and applying a polymeric film (e.g., in the form of a tube) over the outer surface of the mounting article, preferably after a monolith is disposed within the mounting article (i.e., the mounting article is mounted around the monolith). In some embodiments, the polymeric film is a heat shrinkable polymeric film, and the method further comprises heating the heat shrinkable polymeric film such that the film shrinks around the outer surface of the mounting article.

Figure 2:
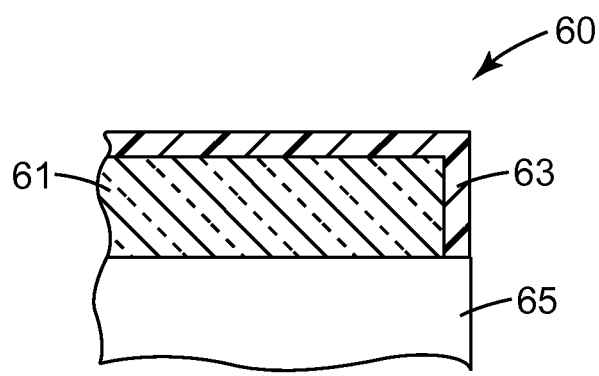
FIG. 2 is a partial cross-sectional view of another exemplary mounting article described herein.

Referring to FIG. 2, mounting article 60, described herein, comprises tubular, continuous, seamless, compressible, resilient mounting article (e.g., a tubular shaped mounting mat) 61 and polymeric film 63 on pollution control element (e.g., a catalytic converter or diesel particulate filter monolith or other element) 65.

The mounting article can be held onto the pollution control element by stretching the inner surface of the mounting article onto the pollution control element via an expanding cone-shaped wedge or other suitable device. Alternatively, the mounting article can be held onto the pollution control element by compression (e.g., the outer surface of the mounting article can be under compression at least in part via a heat-shrunk film, e.g., in the form of a tube). For example, the present disclosure also provides a method of making an article, the method comprising:

providing a tubular, continuous, seamless, compressible, resilient mounting article described herein having an inner surface, an inner first circumference and inner geometric shape;

providing a pollution control element having an outer surface, an outer circumference, and an outer geometric shape, wherein the inner circumference is smaller than the outer circumference, the first and second geometric shapes being generally the same; and combining the tubular, continuous, seamless, compressible, resilient mounting article and the pollution control element, at least in part, with an expanding cone assembly such that the outer surface of the pollution control element is frictionally contacting the inner surface of the mounting article typically such that the mounting article is held securely in place on the monolith by having the inner surface of the mounting article in tension and/or the outer surface of the mounting article in compression.

In one embodiment, the mounting article is held onto the pollution control element by stretching an inner surface of the mounting article enough to be disposed around a corresponding outer surface of the pollution control element. For example, with a tube-shaped mounting mat having an inner surface with an inside circumference that is smaller than a corresponding outside circumference of a pollution control element (e.g., a converter or filter monolith), the tube-shaped mounting mat can be put under circumferential tension (i.e., stretched) such that the inside circumference of the mounting mat is increased enough to allow the tubular mat to be disposed around the outside circumference of the pollution control element (e.g., see FIG. 1). The tubular mounting mat can be stretched onto the pollution control element by using a cone-shaped expanding wedge having a circumference at one end that is the same or smaller than the inside circumference of the tubular mounting mat and another circumference at its other end that is at least as large as, and preferably larger than, the corresponding outside circumference of the pollution control element. The tube-shaped mat can be mounted onto the pollution control element by positioning the cone-shaped wedge so that its larger circumference end is disposed at a corresponding end of the pollution control element. Next, one of the open ends of the tubular mounting mat is positioned onto the smaller circumference end of the cone-shaped wedge, and then the tubular mat is forced over the wedge toward its larger circumference end and onto the pollution control element. Because the outside circumference of the pollution control element is larger than the inside circumference of the tube-shaped mounting mat, at least the inner circumference of the tubular mat remains in tension, after the tubular mounting mat is forced over the wedge and onto the pollution control element. This tension causes the tubular mat to exert a normal force against the pollution control element, which increases the frictional forces between the mat and the pollution control element and causes the mat to remain in position around the pollution control element.

Advantages of such embodiments where the mounting article is held in tension or compression onto the monolith include that the mounting article being fixed tightly on the surface of the monolith allows easy assembly of the pollution control device without the mat slipping during assembly. The mounting article held in compression by a heat shrinkable film (e.g., in the form of a tube) has the added advantage of encapsulating the article and preventing fibers from escaping into the air during handling and assembly.

Tubular, continuous, seamless, compressible, resilient mounting article described herein can be used, for example, for mounting pollution control devices. In some embodiments, the tubular, continuous, seamless, compressible, resilient mounting articles described herein and a pollution control element having an outer surface frictionally contacts the inner surface of the mounting article. The metallic casing of the pollution control device can be made from materials known in the art for such use, including stainless steel.

Exemplary pollution control elements include gasoline pollution control elements as well as diesel pollution control elements. The pollution control element may be a catalytic converter or a particulate filter, or trap. Catalytic converters contain a catalyst, which is typically coated on a monolithic structure mounted within a metallic housing. The catalyst is typically adapted to be operative and effective at the requisite temperature. For example, for use with a gasoline engine the catalytic converter should typically be effective at a temperature in a range from 400° C. to 950° C., whereas for a diesel engine lower temperatures (typically not more than 350° C.) are common. The monolithic structures are typically ceramic, although metal monoliths are also sometimes used. The catalyst oxidizes carbon monoxide and hydrocarbons and reduces the oxides of nitrogen in exhaust gases to control atmospheric pollution. While in a gasoline engine all three of these pollutants can be reacted simultaneously in a so-called "three way converter," most diesel engines are equipped with only a diesel oxidation catalytic converter. Catalytic converters for reducing the oxides of nitrogen, which are only in limited use today for diesel engines, generally consist of a separate catalytic converter. Examples of pollution control elements for use with a gasoline engine include those made of cordierite that are commercially available, for example, from Corning Inc., Corning, N.Y., or NGK Insulators, LTD., Nagoya, Japan, or metal monoliths commercially available, for example, from Emitec, Lohmar, Germany.

Suitable selective catalytic reduction elements are available, for example, from Corning, Inc., Corning, N.Y.

Diesel particulate filters or traps are typically wall flow filters, which have honeycombed, monolithic structures typically made from porous crystalline ceramic materials. Alternate cells of the honeycombed structure are typically plugged such that exhaust gas enters in one cell and is forced through the porous wall to an adjacent cell where it can exit the structure. In this way, the small soot particles that are present in diesel exhaust gas are collected. Suitable diesel particulate filters made of cordierite are commercially available, for example, from Corning Inc. and NGK Insulators, Inc. Diesel particulate filters made of silicon carbide are commercially available, for example, from Ibiden Co. Ltd., Japan, and are described in, for example, JP 2002047070A, published Feb. 12, 2002.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Real Condition Fixture Test (RCFT)

This test was used to measure the pressure exerted by the mounting article under conditions representative of actual conditions found in a pollution control element such as a catalytic converter in actual use.

A sample of the mounting article having dimensions of 44.45 mm by 44.45 mm was placed between two 50.8 mm by 50.8 mm heated, metal platens having independent heating controls. Each platen was heated incrementally from room temperature (about 25° C.) to a different temperature profile to simulate the temperatures of the metal housing and the monolith in a pollution control device. During heating, the gap between the platens was increased by a value calculated from the temperatures and thermal expansion coefficients of a typical catalytic converter housing and monolith. After heating to the maximum temperature of 900° C. for the platen representing the monolith side and 530° C. for the platen representing the metal housing side (also referred to herein as 900° C./530° C.), the platens were cooled incrementally while the gap was decreased by a value calculated from the temperatures and thermal expansion coefficients. This thermal cycling was conducted three times.

The materials were initially compressed to a starting pressure of about 200 kilopascals (kPa). The force exerted by the mounting material was measured using a computer controlled load frame with an Extensometer (obtained under the trade designation "SINTECH ID" from MTS Systems Corp., Research Triangle Park, N.C.). The pressure exerted by the mat during the heating and cooling cycle is plotted against the temperature profile. The sample and platens were cooled to room temperature, and the cycle was usually repeated two more times to produce a graph having 3 plots of pressure vs. temperature. A minimum value of at least 50 kPa for each of the three cycles was typically considered desirable for a mounting mat. Lower values may still be suitable depending on the particular application.

Example 1

2.7 kg of annealed ceramic fiber (obtained under the trade designation "CERAFIBER" from Thermal Ceramics, Augusta, Ga.) was slowly added to 189 liters (50 gallons) of water while being mixed with a low shear industrial mixer at about 400 revolutions/minute. When all of the fiber was dispersed and no clumps remained, 273 grams of latex (an aqueous emulsion of ethylene vinyl acrylate terpolymer having 55 weight percent solids obtained under the trade designation "AIRFLEX 600 BP" from Air Products, Philadelphia, Pa.) was added. The latex addition was followed by adding 13.65 grams of a polymer blend (50% solids; obtained under the trade designation "MP 9307C" from Mid South, Ringgold, La.), followed by an addition of 17.3 grams of defoamer (obtained under the trade designation "FOAMASTER III" from Henkel, Germany). An additional 94.6 liters (25 gallons) of water was then added to the slurry.

About 38 liters (10 gallons) of above slurry was pumped into to a forming tank. A cylindrical perform was made by dipping the screen side of a forming die attached to a vacuum system into the uniformly mixed slurry. The die was cylindrically shaped and formed from a 50 mesh (0.3 mm×0.3 mm openings) screen over a plastic tube with 3 mm diameter holes uniformly spaced at 12 mm intervals over its entire surface. It had a forming length of 10 cm and an outside diameter of 11.8 cm. The vacuum was on for 2 seconds while the die was submerged in the slurry, during which time the preform was formed. It was then put in a drying chamber with a heat gun blowing against it at a temperature of about 150° C. for 1 minute while still on the die and still pulling vacuum. The vacuum was then discontinued and the preform was removed from the die. It was then put in a drying oven at 150° C. for approximately 2 hours.

The part had a weight per area of 1079 $g/m^2$, a thickness of 9.2 mm, and a density of 0.12 $g/cm^3$. It was tested in the RCFT up to a maximum 900° C./530° C., hot side/cold side temperature for three cycles. It had a minimum pressure of 30 kPa and a maximum pressure of 248 kPa over the entire temperature range during the 3 cycles.

Example 2

A second non-intumescent cylinder was molded as described in Example 1. It was slipped onto a ceramic monolith that had an outside diameter of about 11.8 cm. and 15.2 cm long until it was axially equidistant from both ends. The monolith had a diameter about 2 mm smaller than the inside diameter of the mounting article.

A heat shrinkable polyethylene tube having an inside diameter about 5 mm larger than the mat-wrapped monolith and a width about 40 mm wider than the length of the mounting article was slipped over the mounting article. Using a heat gun, the film was heated until it was shrunk tightly onto the mounting article putting the mounting article into compression against the monolith. The mounting article was completely encapsulated by the film. The cylindrical mounting article was fixed tightly to the monolith surface and did not move relative to the monolith when the mat-wrapped monolith was dropped from a height of 6 cm in the axial direction onto a table top.

Example 3

6.4 kg of ceramic fiber (obtained under the trade designation "7000 M" from Unifrax Corp., Niagara Falls, N.Y.) was slowly added to 210 liters (53.2 gallons) of water while being mixed with a low shear industrial mixer at about 400 revolutions/minute. While continuing to mix, the following was added in order: 114 grams of sodium aluminate (31.5 wt. % solids), 2436 grams of latex (45.5 wt. % solids; obtained under the trade designation "RHOPLEX HA-8" from Rohm & Haas, Philadelphia, Pa.), 36 grams of defoamer (obtained under the trade designation "FOAMASTER II" from Henkel, Germany)I, 440 grams of aluminum sulphate (50 wt. % solids). 10.3 kg of unexpanded vermiculite (from Cometals Inc.) was then added to the slurry and another 189 liters (50 gallons) of water was added.

About 38 liters (10 gallons) of above slurry was pumped to a forming tank and formed into a perform as described in Example 1, except it was kept in the drying oven at 150 C for about 3 hours.

The part had a weight per area of 5111 g/m², a thickness of 12.6 mm, and a density of 0.41 g/cm³. It was tested in the RCFT up to a maximum 900° C./530° C., hot side/cold side temperature for three cycles. It had a minimum pressure of 48 kPa and a maximum pressure of 1110 kPa over the entire temperature range.

Example 4

A second intumescent cylinder was molded as described in Example 3. A plastic assembly cone having an outside diameter of 12.3 cm on its large end, an outside diameter of 11.5 cm on its small end, and a length of 8.7 cm was placed with its large end on top of a 12.3 cm diameter by 12.7 cm long ceramic monolith. The intumescent cylinder was placed over the small end of the assembly cone. Using two hands, the intumescent cylinder was slid over the cone putting it into tension and stretching it over the ceramic monolith until it was axially equidistant from both ends. The cylindrical mounting article was fixed tightly to the monolith surface and did not move relative to the monolith when the mat-wrapped monolith was dropped onto a table top from a height of 6 cm in the axial direction.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A mounting article having a continuous and seamless tubular shape independent of a pollution control element, with first and second opposed open ends, a cross section deformable in any direction by at least 2% without breaking, a wall thickness compressible up to and including 60% without applying a compressive force exceeding 1000 kPa, an outer surface, an inner surface, at least a portion of which is curved, a central longitudinal axis, and a uniform internal cross-sectional area along the central longitudinal axis, wherein the mounting article comprises inorganic fibers.

2. The mounting article of claim 1 having a Resiliency Value after three thermal cycles from 25° C. to 900° C./530° C. of the Real Condition Fixture Test of at least 20 kPa.

3. The mounting article of claim 1 having a Resiliency Value after three thermal cycles from 25° C. to 900° C./530° C. of the Real Condition Fixture Test in a range from 20 kPa to 1400 kPa.

4. The mounting article of claim 1, wherein the mounting article as-made prior to heating above 500° C. contains not greater than 1 percent by weight organic material, based on the total weight of the mounting article.

5. The mounting article of claim 1, wherein the mounting article as-made prior to heating above 500° C. contains zero percent by weight organic material, based on the total weight of the mounting article.

6. The mounting article of claim 1, has one layer forming its outer surface and another layer forming its inner surface.

7. The mounting article of claim 6, wherein each layer is different.

8. The mounting article of claim 6, wherein each layer is either an intumescent layer or a non-intumescent layer, but they are not both intumescent or non-intumescent layers.

9. An article comprising the mounting article of claim 1 and a pollution control element having an outer surface frictionally contacting the inner surface of the mounting article, wherein the mounting article is in a stretched state with the inner surface of the mounting article being under tension.

10. A pollution control device comprising the article of claim 9 disposed in a casing.

11. The article of claim 9, wherein the pollution control element has an outside diameter, and when the mounting article is separate from the pollution control element, the mounting article has an inside diameter that is smaller than the outside diameter of the pollution control element.

12. An article comprising a pollution control element having an outer surface, the mounting article of claim 1, and a polymeric material covering disposed so as to provide a compressive force onto the outer surface of the mounting article that causes the inner surface of the mounting article to frictionally contact the outer surface of the pollution control element.

13. The article of claim 12, wherein the polymeric material cover is a polymeric shrinkable film covering the outer major surface of the mounting article, with the polymeric shrinkable film being shrunk so as to put the outer surface of the mounting article under compression.

14. The article of claim 13, wherein each of the opposing open ends of the mounting article has a seamless annular edge covered by the polymeric covering.

15. The article of claim 14, wherein the film is in the form of a tube.

16. The article of claim 13, wherein the film is in the form of a tube.

17. A pollution control device comprising a pollution control element mounted in a casing with the mounting article of claim 1.

18. A method comprising:
providing a mounting article of claim 1; and applying a shrinkable polymeric film over the outer surface of the mounting article.

19. The method of claim 18, wherein the polymeric film is a heat shrinkable polymeric film, and the method further comprises:

heating the heat shrinkable polymeric film such that the film shrinks around the outer surface of the mounting article.

20. A method comprising:

providing a mounting article of claim 1 having an inner surface, an inner circumference and inner geometric shape;

a pollution control element having an outer surface, an outer circumference and an outer geometric shape, wherein the inner circumference of the mounting article is smaller than the outer circumference of the pollution control element, and the first and second geometric shapes are generally the same; and disposing the mounting article around the pollution control element, at least in part, using a cone-shaped expanding wedge such that the inner surface of the mounting article is under tension and the outer surface of the pollution control element is frictionally contacting the inner surface of the mounting article.

\* \* \* \* \*